United States Patent
Wan et al.

(10) Patent No.: US 9,608,952 B2
(45) Date of Patent: Mar. 28, 2017

(54) SYSTEMS AND METHODS FOR USER DEVICE INTERACTION

(71) Applicants: Chieh-Yih Wan, Beaverton, OR (US); Sangita Sharma, Portland, OR (US); Giuseppe Raffa, Portland, OR (US)

(72) Inventors: Chieh-Yih Wan, Beaverton, OR (US); Sangita Sharma, Portland, OR (US); Giuseppe Raffa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 956 days.

(21) Appl. No.: 13/714,908

(22) Filed: Dec. 14, 2012

(65) Prior Publication Data

US 2014/0172990 A1 Jun. 19, 2014

(51) Int. Cl.
| | | |
|---|---|---|
| G06F 15/16 | (2006.01) | |
| H04L 12/58 | (2006.01) | |
| H04W 4/02 | (2009.01) | |
| H04W 4/04 | (2009.01) | |
| H04W 4/14 | (2009.01) | |

(52) U.S. Cl.
CPC ............. *H04L 51/14* (2013.01); *H04W 4/025* (2013.01); *H04W 4/046* (2013.01); *H04L 51/046* (2013.01); *H04W 4/14* (2013.01)

(58) Field of Classification Search
USPC ........... 709/217, 206; 719/318; 701/22, 414, 701/424; 340/435
See application file for complete search history.

(56) References Cited

U.S. PATENT DOCUMENTS

| | | | | |
|---|---|---|---|---|
| 3,758,765 A | * | 9/1973 | Vietor | G01C 23/00 235/61 NV |
| 3,868,497 A | * | 2/1975 | Vietor | G01C 23/00 244/186 |
| 3,875,379 A | * | 4/1975 | Vietor | G01C 23/00 244/185 |
| 6,574,629 B1 | * | 6/2003 | Cooke, Jr. | G06F 19/321 |
| 7,365,651 B2 | | 4/2008 | Massey et al. | |
| 7,610,151 B2 | * | 10/2009 | Letchner | G01C 21/3484 701/424 |
| 7,706,964 B2 | * | 4/2010 | Horvitz | G01C 21/3492 342/357.31 |

(Continued)

FOREIGN PATENT DOCUMENTS

| | | |
|---|---|---|
| CN | 101898561 A | 12/2010 |
| KR | 10-2012-0087634 A | 8/2012 |

OTHER PUBLICATIONS

International Search Report and Written Opinion received for PCT Patent Application No. PCT/US2013/048190, mailed on Jan. 6, 2013, 11 pages.

(Continued)

*Primary Examiner* — Tammy Nguyen
(74) *Attorney, Agent, or Firm* — Sutherland Asbill & Brennan LLP

(57) ABSTRACT

Systems and methods for receiving a communication on one or more user devices within a vehicle and redirecting the communications based at least in part on one or more user profiles associated with occupants of the vehicle is disclosed. The redirection of the communication may further be based at least in part on one or more sensor signals or a drive characteristic associated with the vehicle.

17 Claims, 8 Drawing Sheets

(56) References Cited

U.S. PATENT DOCUMENTS

| | | | |
|---|---|---|---|
| 7,739,040 B2* | 6/2010 | Horvitz | G01C 21/3492 701/414 |
| 8,126,641 B2* | 2/2012 | Horvitz | G01C 21/3415 340/995.19 |
| 8,180,379 B2 | 5/2012 | Forstall et al. | |
| 2002/0055901 A1* | 5/2002 | Gianakouros | G06Q 40/04 705/37 |
| 2004/0037236 A1 | 2/2004 | Massey et al. | |
| 2007/0018800 A1* | 1/2007 | Boss | B60Q 9/008 340/435 |
| 2008/0004802 A1 | 1/2008 | Horvitz | |
| 2008/0027643 A1 | 1/2008 | Basir et al. | |
| 2008/0084283 A1* | 4/2008 | Kalik | B60Q 9/00 340/435 |
| 2008/0094313 A1 | 4/2008 | Simon et al. | |
| 2008/0133082 A1 | 6/2008 | Rasin et al. | |
| 2010/0280711 A1 | 11/2010 | Chen et al. | |
| 2011/0029168 A1* | 2/2011 | Talberg | B60K 6/48 701/22 |
| 2011/0106375 A1* | 5/2011 | Gurusamy Sundaram | H04W 4/00 701/31.4 |
| 2013/0046457 A1* | 2/2013 | Pettersson | G01C 21/3469 701/117 |
| 2013/0135109 A1* | 5/2013 | Sharon | G08B 21/02 340/576 |

OTHER PUBLICATIONS

European Search Report from EP Application No. 13863414.2 mailed Apr. 28, 2016. (11 pgs.)

Office Action issued in Chinese Patent Application No. 201380059477.0, dated Nov. 30, 2016, 9 pages. No translation available.

* cited by examiner

SYSTEMS AND METHODS FOR USER DEVICE INTERACTION

TECHNICAL FIELD

This disclosure generally relates to systems and methods for managing user device interactions within a vehicle.

BACKGROUND

Occupants, such as the driver and passengers, of a vehicle may often have user devices that they bring within the cabin of the vehicle. Often times each occupant such as the driver and the passengers may have an individual user device. These user devices may include cell phones, smart phones, game playing systems, digital display systems or the like. When content or media or communications are rendered via these user devices, it may distract the driver and/or other passengers within the vehicle. In some cases, the distraction may compromise safety of the occupants of the vehicle.

BRIEF DESCRIPTION OF THE FIGURES

Reference will now be made to the accompanying figures which are not necessarily drawn to scale and wherein.

DETAILED DESCRIPTION OF EMBODIMENTS OF THE INVENTION

Figure 1:
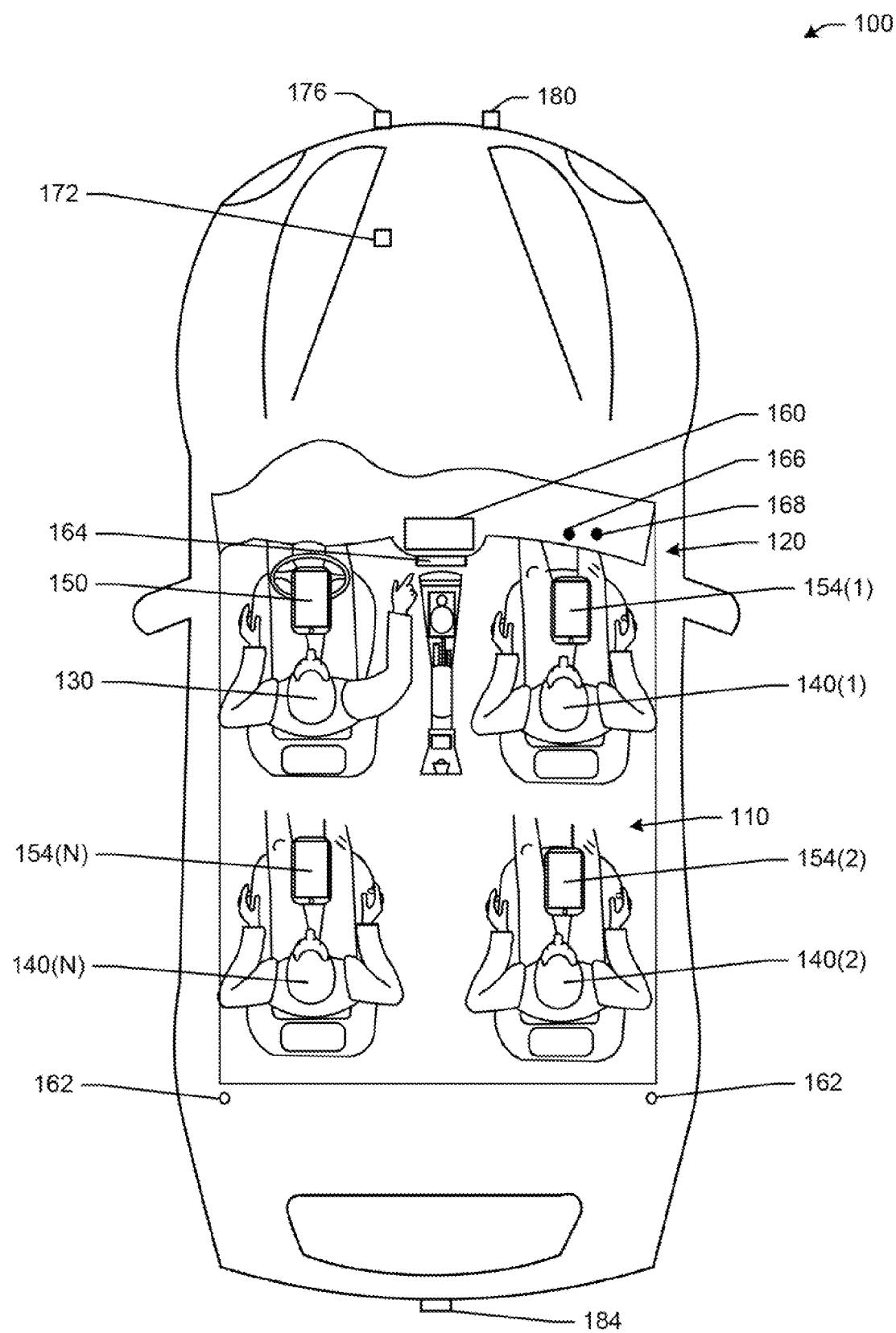
FIG. 1 is a simplified schematic diagram of an example vehicle with a driver and passengers in accordance with embodiments of the disclosure.

Embodiments of the disclosure are described more fully hereinafter with reference to the accompanying drawings in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the disclosure may provide systems, apparatus, and methods for routing and/or re-routing communications from a user device within a vehicle based, at least in part, on drive characteristics, user preferences, and user characteristics. Communications as used herein may refer to any variety of communications received and/or transmitted on a user device, such as a user device associated with occupants of the vehicle. These communications ma include, but are not limited to, phone calls, text messages, short message service (SMS) messages, social media messages, or the like. Drive characteristics may be related to aspects of driving activities and/or traffic. The drive characteristics may be ascertained based, at least in part, one or more sensor signals from sensors disposed throughout the vehicle. User preferences may be identified and/or determined based upon a user profile that may be set by that user or learned by the systems as describe herein. User characteristics may be related to current user/vehicle occupant activities within the vehicle and may be ascertained by the systems and apparatuses described herein based, at least in part, on one or more sensors and signals generated therefrom. In certain embodiments, the user characteristics activities may be continuously and/or periodically determined and may be used to update a user characteristics log indicating current user activities.

The one or more user profiles may be associated with one or more of the occupants of the vehicle, such as the driver and/or passengers within the vehicle, based at least in part on user preferences related to routing and/or re-routing of communications and/or content in a variety of situations. In certain embodiments, the methods, as disclosed herein, may be performed by an in-vehicle infotainment (IVI) system including one or more processors and/or software elements. The IVI system may be configured to access one or more user profiles locally and/or remotely. The IVI system may further be configured to receive one or more signals and determine from those one or more signals the occupants that are within the cabin of the vehicle. The IVI system may still further be configured to ascertain drive characteristics based upon sensor signals received from a variety of sensors disposed throughout the vehicle. The IVI system may yet further be configured to ascertain user characteristics and/or activities within the vehicle cabin based, at least in part, on one or more sensors disposed throughout the cabin of the vehicle and/or communications with one or more user devices.

In one aspect, the IVI system may be configured to identify occupants such as the driver and passengers within the vehicle based, at least in part, on user devices associated with those occupants. For example, a particular driver of the vehicle may have a smartphone that may communicate with the system of the vehicle and based upon the communications, the IVI system may be configured to identify that user device in the form of a smartphone and, therefore, ascertain that the individual associated with that user device is within the vehicle. Therefore, the IVI system may be configured to identify occupants of the vehicle based, at least in part, on user devices that are detected within the vehicle such as via communicative links and/or communications between the user device and the IVI system. The user devices may communicate with the IVI system using any suitable mechanism for communications, such as wireless communications via Bluetooth. The IVI system may further be configured to identify occupants of the vehicle based upon image processing mechanisms. For example, the IVI system may receive signals from an image sensor and based upon facial recognition technology be able to determine users that may be within the cabin of the vehicle. A subset of users, i.e. only the driver or only the driver and passenger in the front seat, can be determined based on camera looking at the front seats. There may be additional cameras in the back seat to identify the back seat passengers. Alternately, an application running on each smartphone can show a virtual representation of the vehicle letting each vehicle occupant indicates where he/she is sitting, communicating this information to the IVI system.

Once the IVI system determines the occupants of a vehicle, such as the driver and the passengers, and optionally determines the relative locations of the occupants, the IVI system may be configured to access a user profile corresponding to one or more of those occupants with accessible user profiles. In other words, the occupant profiles may be identified by the IVI system once the occupants are identified within the vehicle. The user profile may contain information related to preferences that the occupant has in terms of routing of communications such as a phone call received via a smartphone. For example, a driver of the vehicle may have information within his/her user profile that indicates that if a call is received while that driver is operating the vehicle, then that call is to be routed to the speakers of the vehicle rather than to the driver's smartphone. Another profile may indicate that a particular driver may want a received call routed to a specific occupant of the vehicle such as to an occupant. In the front passenger seat or a particular passenger depending on their social relationship, e.g., spouse, children, co-worker, etc. The profile may optionally indicate such rules depending on the caller. The profiles may, in certain embodiments, be stored in memory associated with the IVI system. In other embodiments, the profiles associated with the occupants of the vehicle may be received from a profile server that may be remote to the system and the vehicle. In some cases, the IVI system may be configured to update a user profile based upon user behavior and provide the updated user profile to a remote server, such as a profile server.

The IVI system may further be configured to determine one or more drive characteristics, such as if the vehicle is accelerating or decelerating or turning or the like. These drive characteristics may be determined based, at least in part, on one or more sensor signals. For example, the IVI system may receive inputs from sensors such as a light detection and ranging (LIDAR) detectors, a radio detection and ranging (RADAR) detector, a sound detection and ranging (SONAR) detector, accelerometers, global positioning satellite (GPS), or the like. In some cases, the external sensors signals may indicate the acceleration, deceleration, angular velocity, slip angle, roll, and/or yaw rate of the vehicle and further indicate a range to one or more other vehicles or structures on a roadway. Based on the drive characteristics, the IVI system may be configured to determine if the driver or other passengers within the vehicle are currently distracted or need to pay a relatively higher level of attention to the road and/or driving. For example, if the sensor signals indicate that the vehicle is on an on-ramp of a highway, then the IVI system may determine that the driver should be engaged in activities to ensure the safety of the occupants of the vehicle, such as observing traffic on the highway. During such times when the driver may be distracted, the IVI system may determine that it is unsafe to route communications to the driver or engage the driver in activities that may distract him/her from driving, the vehicle. In these cases, the IVI system may route and/or re-route an incoming phone call to the driver's user device to another passenger within the vehicle or let the call go to voicemail or other memory/buffering system. In some cases, routing and/or re-routing incoming calls to the driver's user device may be based, at least in part, on both the drive characteristics, as determined by the IVI system, as well as user preferences of routing of calls and communications, as identified from the user profile corresponding to the driver.

The system may further be configured to determine the activities and/or characteristics of occupants within the vehicle. These activities may include determining a particular occupant's interaction with his/her user device, determining if two or more occupants are engaged in conversation or other activities, or determining if one or more passengers are assisting the driver with navigation or providing other help associated with driving. For example, the IVI system may be configured to determine if a child in the rear passenger seats is playing an interactive game on his or her user device. As another example, the IVI system may be configured to determine if the occupant in the front passenger seat is assisting the driver in navigating. These determinations of user activities may be based, at least in part, on sensor signals from sensors disposed within the cabin of the vehicle such as microphones that may pick up user conversations or image sensors that may be used to determine facial profiles associated with communications.

In certain embodiments, routing or re-routing of communications received by one or more of the occupants within the vehicle may be based on one or more of the drive characteristics, the user preferences and/or user activities. For example, the user profile associated with a particular occupant may specify that that occupant may not be disturbed with an incoming call when that occupant is in the middle of a particular interactive game that cannot be paused or stopped temporarily. In another example, a user profile may indicate that a driver of the vehicle may not be interrupted with an incoming communication if the current drive characteristics requires full driver focus to ensure safety of the occupants of the vehicle For example, the driver may not be interrupted if he or she is taking a turn or is on an on-ramp of a highway. As a further example, a passenger profile may indicate that that particular passenger may not be interrupted within an incoming communication if that passenger is assisting the driver with navigation.

Example embodiments of the disclosure will now be described with reference to the accompanying figures.

Referring now to FIG. 1, an example vehicle 100 configured to perform the methods in accordance with embodiments of the disclosure is described. The vehicle 100 may include a cabin 110 and an outer-body 120. The cabin 110 of the vehicle 100 may include one or more occupants such as a driver 130 and one or more passengers 140(1)-(N), herein referred to individually or collectively as passengers 140. The driver may have one or more user device(s) 150 associated with him/her. Similarly, the passengers may also have one or more user devices 154(1)-(N) associated with them, individually or collectively referred to as user device 154. The vehicle 100 may further include an IVI system 160. The IVI system 160 may output or render content via one or more output elements, such as speakers 162. The IVI system 160 may further receive and/or display content and/or user interaction via one or more input-output (I/O) devices, such as control panel 164. In certain embodiments, the control panel 164 may include a display screen on which images and/or video may be displayed. In the same or further embodiments, the control panel 164 may have a touch sensitive display screen and/or peripheral input elements for accepting user based input. The IVI system 160 may be configured to render content such as video or images on the I/O device 164 and audio on the speakers 162.

The IVI system 160 may further be configured to receive one or more signals from one or more sensors within the cabin 110, such as one or more microphones 166 and/or one or more image sensors 168. The IVI system 160 may be configured to determine if occupants of the vehicle 100 are engaged in conversation and/or currently otherwise disposed in functions related to navigating the vehicle based at least in part on signals from sensors 166, 168. The vehicle 100 may include a variety of additional sensors such as sensors that are disposed on the body 120. These sensors may include accelerometer(s) 172, LIDAR 176, RADAR 180 and/or SONAR 184. Each of the sensors 172, 176, 180, 184 may provide signals to the IVI system 160 that may indicate the present driving characteristic of the vehicle 100. The signals from the sensors 172, 176, 180, 184 may be used by the IVI system 160 or by another appropriate system and/or sub-system of the vehicle 100 to ascertain if the vehicle is currently turning, accelerating, decelerating, engaged in an accident, or is within a predetermined range of another vehicle or object. Therefore, as described herein, the IVI system 160 may be configured to identify the occupants 130, 140 of the vehicle 100, as well as determine one or more drive characteristics and user activities/characteristics within the cabin 110. It will be appreciated that in certain embodiments the IVI system 160 may be configured to identify occupants 130, 140 of the vehicle 100 based, at least in part, on the user devices 150, 154 detected within the cabin 110 of the vehicle 100. In these cases, user device 150, 154 associations with individual occupants 130, 154 may be received and/or known by the IVI system 160. In some cases, the user devices 150, 154 may be detected by the IVI system 160 via wireless communications such as Bluetooth based communications protocols. In other cases, the driver 130 and/or one or more passengers 140 may place their respective user devices 150, 154 into one or more cradles (not shown) that may enable the user devices 150, 154 to communicate with the system 160.

Although a single microphone 166 is depicted, it will be appreciated that there may be any number of microphones disposed throughout the cabin 110 of the vehicle 100 to appropriately detect sound within the cabin 110 of the vehicle 100. The microphones 166 may be of any known type including, but not limited to, a condenser microphones, dynamic microphones, capacitance diaphragm microphones, piezoelectric microphones, optical pickup microphones, or combinations thereof. Furthermore, the microphones 166 may be of any directionality and sensitivity. For example, the microphones 166 may be omni-directional, uni-directional, cardioid, or bi-directional.

Although a single image sensor 168 is depicted, it will be appreciated that there may be any number of image sensors 168 disposed throughout the cabin 110 of the vehicle to appropriately image different portions of the cabin 110. The image sensor 168 may be any known device that converts an optical image or optical input to an electronic signal. The image sensor 168 may be of any known variety including a charge coupled device (CCD), complementary metal oxide semiconductor (CMOS) sensors, or the like. The image sensor 168 may further be of any pixel count and aspect ratio. Furthermore, the image sensor 168 may be sensitive to any frequency of radiation, including infrared, visible, or near-ultraviolet (UV).

Although four sensors, in the form of an accelerometer 172, LIDAR 176, RADAR 180, and SONAR 184, are depicted as disposed on the body 120 of the vehicle 100, it will be appreciated that there may be any number and any variety of sensors. For example, GPS systems, magnetometers and/or gyroscope, or other sensors may be disposed on the vehicle to provide appropriate sensor signals to the IVI system 160 for purposes of determining drive characteristics. As used herein, the accelerometers 172 may be any suitable type of accelerometer including, but not limited to micro-electro-mechanical system (MEMS) accelerometers. The LIDAR 176 may include an electromagnetic radiation emitter that emits coherent radiation, such as a light amplification by stimulated emission of radiation (laser) beam at one or more wavelengths across a relatively wide range, including near-infrared, visible, or near-ultraviolet (UV). In one aspect, the laser beam may be generated by providing the laser with electrical signals. The LIDAR 176 may further include a detector to detect a scattered laser beam reflecting off of an object, such as the vehicle in front of the vehicle 100, and determine a range to the object. Therefore, in certain embodiments, the LIDAR 176 may provide both range information, as well as, information about the change in range to an object. The RADAR 180 may include an electromagnetic radiation emitter that emits microwave radiation. In one aspect, the emitter may be actuated with electrical signals to generate the microwave radiation. The microwave radiation may be of a variety of amplitudes and frequencies. In certain embodiments, the microwave radiation may be mono-tonal or have substantially a single frequency component. The RADAR 180 may further include a detector that may detect scattered microwaves reflecting off of an object, such as another vehicle in front of the vehicle 100, and determine a range to the object. In one aspect, the range may be related to the power of the reflected microwave radiation. RADAR may further use Doppler analysis to determine the change in range between the vehicle 100 and the object. Therefore, in certain embodiments, the RADAR 180 may provide both range information, as well as, information about the change in range to an object. The SONAR 184 may include an acoustic emitter that emits compression waves at any frequency, such as frequencies in the ultra-sonic range. In one aspect the emitter may be actuated with electrical signals to generate the sound. The sound may be of a variety of tones, magnitude, and rhythm. Rhythm, as used herein, is a succession of sounds and silences. In one aspect, the sound may be a white noise spanning a relatively wide range of frequencies with a relatively consistent magnitude across the range of frequencies. Alternatively, the sound may be pink noise spanning a relatively wide range of frequencies with a variation in magnitude across the range of frequencies. In yet other alternatives, the sound may be mono-tonal or may have a finite number of tones corresponding to a finite number of frequencies of sound compression waves. In certain embodiments, the emitter may emit a pulse of sound, also referred to as a ping. The SONAR 184 may further include a detector may detect the ping as it reflects off of an object, such as a vehicle, and determine a range to the object by measuring the time it takes for the sound to arrive at the SONAR detector. In certain embodiments, the SONAR 184 may provide both range information, as well as, information about the change in range to an object.

Figure 2:
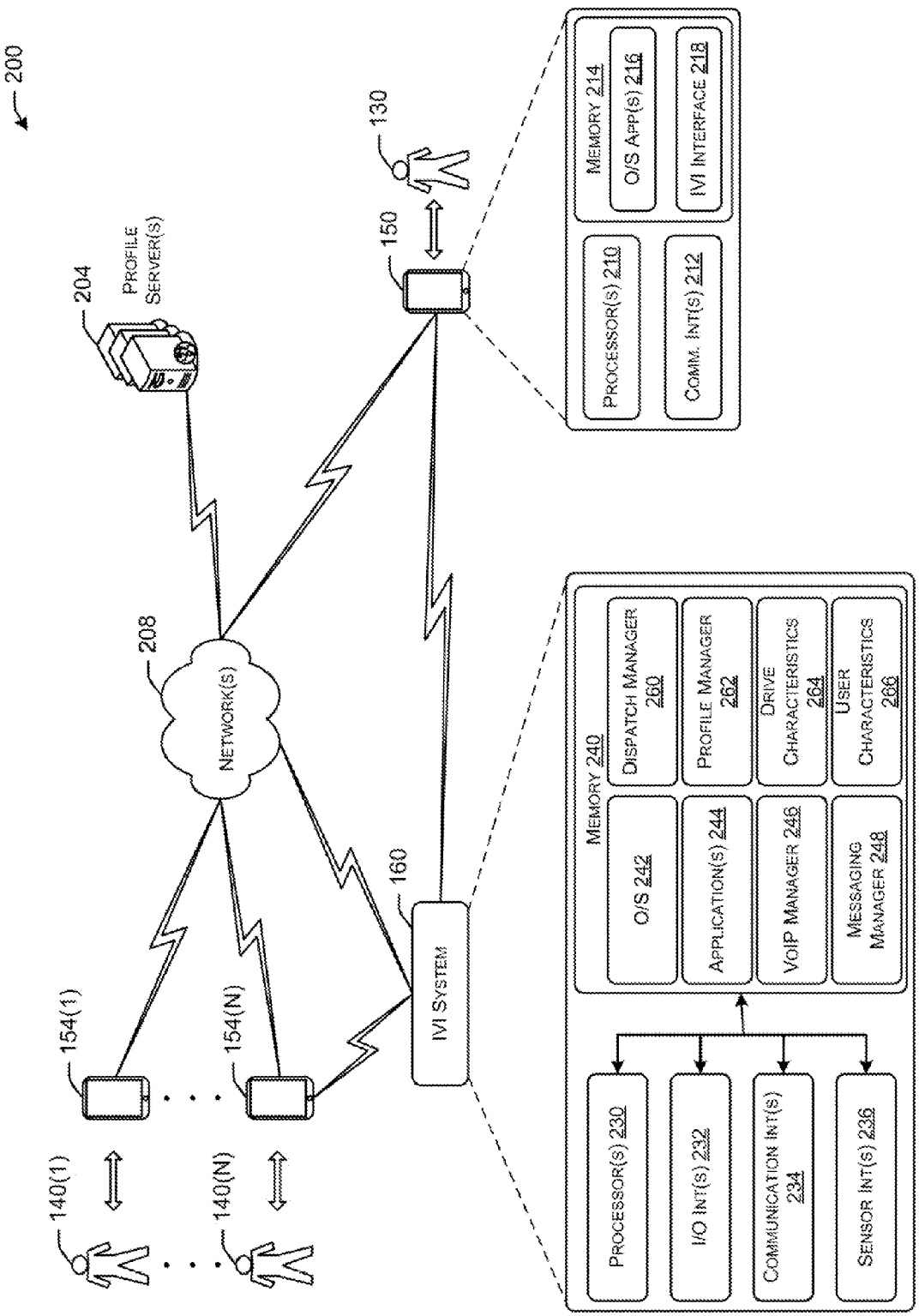
FIG. 2 is a simplified block diagram illustrating an example architecture for providing routing of content and/or communications in accordance with embodiments of the disclosure.

Referring now to FIG. 2, an example architecture 200 for routing and/or re-routing communications is described in accordance with embodiments of the disclosure are described. The architecture 200 may include the IVI system 160 and user devices 150, 154 associated with occupants 130, 140, respectively. The architecture 200 may further include one or more network connections 208 and one or more profile servers 204. The user devices 150, 154 may be directly communicatively linked to the IVI system 160 or communicatively linked via one or more networks 208. The profile server 204 may be communicatively connected to the IVI system 160 via the networks 208 or other suitable communicative links. The profile servers 204 may further be configured to receive and transmit one or more user profiles based upon a query. For example, an IVI system 160 may request one or more user profiles from the profile servers 204 and the profile servers 204 may be configured to provide the one or more user profiles responsive to the received request. The profile servers 204 may include one or more processors and memory and may access one or more user profiles associated with the request sent by the IVI system 160. The IVI system 160 may further be configured to provide one or more user profiles or updated user profiles to the profile servers 204. The one or more processors of the profile servers 204 may store the user profiles received by the profile servers 204 to memory associated with the profile servers or to one or more external databases.

The user devices 150, 154 will now be described further. User device 150 and the components therewith will be described, but it will be appreciated that user devices 154 may have the same or similar components as the user device 150. User device 150 may include one or more processors 210, one or more communications interfaces 212 and one or more memories 214, and one or more sensors.

In some examples, the processors 210 of the user device 150 may be implemented as appropriate in hardware, software, firmware, or combinations thereof. Software or firmware implementations of the processors 210 may include computer-executable or machine-executable instructions written in any suitable programming language to perform the various functions described. Hardware implementations of the processors 210 may be configured to execute computer-executable or machine-executable instructions to perform the various functions described. The one or more processors 210 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 150 may also include a chipset (not shown) for controlling communications between the one or more processors 210 and one or more of the other components of the user device 150. The one or more processors 210 may also include one or more application specific integrated circuits (ASICs) or application specific standard products (ASSPs) for handling specific data processing functions or tasks. In certain embodiments, the user device 150 may be based on an Intel® Architecture system and the one or more processors 210 and chipset may be from a family of Intel® processors and chipsets, such as the Intel® Atom® processor family.

The communications interfaces(s) 212 may allow the user device 150 to communicate via the one or more network(s) 208 and/or via other suitable communicative channels. For example, the user device 150 may be configured to communicate with stored databases, other computing devices or servers, user terminals, other devices on the networks 208 and/or repositories of user profiles and/or content.

The memory 214 may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 214 may store program instructions that are loadable and executable on the processor(s) 210, as well as data generated or received during the execution of these programs. Turning to the contents of the memory 214 in more detail, the memory 214 may include one or more modules, such as an operating system and applications module 216 and an IVI interface module 218. The operating system and applications module 216 may have stored thereon instructions, programs, and/or applications for providing the processors 210 with an operating system and applications software.

The IVI interface module 218 may include instructions, programs, and/or applications therein, that when executed by processors 210 enable the user device 150 to communicate and interface with the IVI system 160. In one aspect the processors 210 may use the communications interface 212 to engage in communications with the IVI system 160. This communications may be via direct wireless communications between the user device 150 and the processors 210 thereon with the IVI system 160 or may be communications directed via the network 208 with the IVI system 160. The wireless direct communications may be using any variety of suitable protocols such as Bluetooth or Wi-Fi Direct. The instructions stored in the IVI interface 218 may further enable the processors 210 to provide an identification of the particular user device 150 to the IVI system 160. Further, in certain embodiments, the identification provided by the processors 210 to the IVI system 160 may be associated with one or more particular users 130, 140 of the vehicle 100.

Still referring to FIG. 2 and turning now to the elements of the IVI system 160, the IVI system 160 may include one or more processors 230, one or more input interfaces 232, one or more communications interfaces 234, one or more sensor interfaces 236 and one or more memories 240.

In some examples, the processors 230 of the IVI system 160 may be implemented as appropriate in hardware, software, firmware, or combinations thereof. Software or firmware implementations of the processors 230 may include computer-executable or machine-executable instructions written in any suitable programming language to perform the various functions described. Hardware implementations of the processors 230 may be configured to execute computer-executable or machine-executable instructions to perform the various functions described. The one or more processors 230 may include, without limitation, a central processing unit (CPU), a digital signal processor (DSP), a reduced instruction set computer (RISC) a complex instruction set computer (CISC) a microprocessor, a microcontroller, a field programmable gate array (FPGA), or any combination thereof. The IVI system 160 may also include a chipset (not shown) for controlling communications between the one or more processors 230 and one or more of the other components of the IVI system 160. The one or more processors 230 may also include one or more application specific integrated circuits (ASICs) or application specific standard products (ASSPs) for handling specific data processing functions or tasks. In certain embodiments, the IVI system 160 may be based on an Intel® Architecture system and the one or more processors 230 and chipset may be from a family of Intel® processors and chipsets, such as the Intel® Atom® processor family.

The input/output (I/O) device(s) or user interface(s), such as the control panel 164, may be controlled via the one or more 110 device interfaces 232. The communications interfaces(s) 234 may allow the IVI system 160 to communicate via the one or more network(s) 208 and/or via other suitable communicative channels. For example, the IVI system 160 may be configured to communicate with stored databases, other computing devices or servers, user terminals, other devices on the networks 208 and/or repositories of user profiles and/or content. The sensor interfaces 236 may enable the processors 230 of the IVI system 160 to receive signals and direct the operations of the variety of sensors 166, 168, 172, 176, 180, 184 disposed throughout the vehicle 100.

The memory 240 may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAMBUS DRAM (RDRAM), flash memory devices, electrically erasable programmable read only memory (EEPROM), non-volatile RAM (NVRAM), universal serial bus (USB) removable memory, or combinations thereof.

The memory 240 may store program instructions that are loadable and executable on the processor(s) 230, as well as data generated or received during the execution of these programs. Turning now to the memory 240, the memory 240 may include an operating system module 242, an applications module 244, a voice over IP manager 246, a messaging manager module 248, a dispatch manager module 260, a profile manager module 262, a drive characteristics module 264, a user characteristics module 266.

The operating system module 242 may have one or more operating systems stored thereon. The processors 230 may be configured to access and execute one or more operating systems stored in the operating system module 242 to operate the system functions of the IVI system 160. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like. The application module 244 may contain instructions and/or applications thereon that may be executed by the processors 230 to provide one or more services to the user. These instructions and/or applications may, in certain aspects, interact with the operating system module 242 and/or other modules of the IVI system 160.

The voice over IP manager 246 may have instructions stored thereon that when executed by processors 230 enable the IVI system 160 to interface with the one or more user devices 150, 154 to receive voice-based communications such as mobile telephone calls. The processors 230 therefore may be configured to receive the call from the one or more of the user devices 150, 154 and redirect the same in accordance with methods disclosed herein. Similarly, the messaging manager module 248 may have instructions stored thereon that when executed by processors 230 may enable the processors to receive text messages or SMS messages from one or more of the user devices 150, 154. For both the case of the voice and messaging, such as text messaging, the received communications may be via a link between the user device 150, 154 and the IVI system 160 via the networks 208 and communications interfaces 234. The communications link may be, for example, a Bluetooth communication between the user device 150, 154 and the IVI system 160. In certain embodiments the IVI system 160 may be configured to detect when a communications, such as a voice call or a message, is received by one or more of the user devices 150, 154 and, upon receipt of the communication, redirect the communication to the system 160. In certain embodiments the voice over IP manager module 246 and the messaging managing module 248 may have instructions stored thereon, which when executed by processors 230, enable the processors 230 to interface with one or more of the user devices 150, 154 that are within the cabin 110 of the vehicle 100. In these embodiments the processors 230 may interact with the processors 210, via instructions stored in the voice over IP manager module 246, the messaging manager 248, and the IVI interface module 218 of the user device 150, to enable the IVI system 160 to interact seamlessly with the communications received by the user device 150.

The dispatch manager module 260 may have stored thereon instructions that when executed by processors 230, enable the IVI system 160 to receive and redirect a communication from one or more user devices 150, 154. In some cases the dispatch manager module 260 may have instructions stored thereon that enable the processors 230, to ignore a call or let a communication go to voice mail or otherwise be stored in a buffer such as on the user device 150, 154. In certain embodiments, the dispatch manager module 260 may further have instructions stored thereon that when executed by the processors 230, enable the user device 150, 154 to redirect communications directly from one user device 150, 154 to another without interacting via IVI system 160.

The profile manager module 262 may have instructions stored thereon that when executed by processors 230 enable the IVI system 160 to create a user profile associated with a particular user or occupant 130, 140 of the vehicle 100 that indicates preferences associated with the user 130, 140. The user profile may provide information associated with how to handle incoming communications on a particular user's user device 150, 154 given a variety of situations such as drive characteristics and/or user activities. The profile manager module 262 and the instructions stored thereon may enable the processors 230 to observe behavior associated with a particular user 130, 140 during operation of the vehicle 100, in certain cases the observed behavior may be codified into corresponding parameters that constitute a user profile. For example, if the processors 230 detect that a particular call was redirected from a driver's user device 150 to a particular passenger's user device 154, then the IVI system 160 may codify that action as a particular parameter for redirecting a call in the future that is received by the same user device 150 and/or corresponding driver 130. The user profile for a particular user may also have parameters associated with the user being a driver or a passenger. In certain cases, certain individuals may only be a passenger, such as children who are not legally allowed to drive, and in other cases, a particular individual may be either a passenger at some times or a driver of the vehicle 100 at other times. The user characteristics and preferences may be different based upon whether a particular individual is a driver 130 or a passenger 140.

The profile manager module 262 may also have instructions stored thereon that when executed by the processors 230 enable the processors 230 to update a preexisting profile associated with the particular user 130, 140. In this case if there are observed changes in behavior associated with the user, such as the driver 130 or the passenger 140, then the processors 230 may provide new parameters that indicate that change in user behavior. In some cases, user parameters associated with the particular user may be provided in the user profile if a particular behavior was not previously observed. For example, in some cases, the processors 230 may have information, based at least in part on the user profile, pertaining to how to divert or redirect a incoming phone call of a driver to another passenger for a particular caller. However, the profile may not indicate how to redirect a phone call from a different caller. In this case, when that different caller calls the driver's 130 user device 150 and the driver 130 instructs the IVI system 160 to redirect that call to a particular user device 154, the IVI system 160 may learn how to redirect calls from that particular caller in the future.

The profile manager module 262 may further include instructions that when executed by the processors 230 enable the processors 230 to access one or more user profiles associated with occupants 130, 140 within the cabin 110 of the vehicle 100. In certain embodiments the user profiles associated with the occupants 130, 140 may be stored in memory 240 locally on the IVI system 160 or in other cases the user profiles may be stored on a remote server such as the profile server 204. In the case where the user profile is stored on a profile server 204, the IVI system 160 may download the user profile via the one or more networks 208 or other suitable communicative connections to the profile server 204. In some cases, the communicative link to the one or more networks 208 may be intermittent for the IVI system 160. For example, the IVI system 160, in some cases, may not be able to access the networks 208 or the profile server 204 when the vehicle 100 is in operation and being driven. However, the IVI system 160 may be able to access the one or more networks 208 when the vehicle 100 is parked in proximity of the vehicle owner's house. In these cases, when the IVI system 160 has access to the profile servers 204 intermittently, the IVI system 160 may download the appropriate user profiles when communicative connection can be established with the profile servers 204.

The IVI system 160 may also be configured to upload user profiles to the profile server 204. For example, if a particular user profile is updated during use and learning an observation the new user profile can be transmitted to the profile server 204 for update. By saving user profiles to the profile server remotely from the IVI system 160 it is possible for a particular individual to access that profile from multiple vehicles. For example, a particular user 130, 140 may own two vehicles and a profile generated on the first vehicle may be uploaded to the profile server 204 and when the user 130 uses the second vehicle the same profile may be downloaded to that second vehicle 100.

The profile manager module 262 may yet further have instructions stored thereon that when executed by processors 230 enable the processors 230 to identify one or more parameters associated with user preferences and provide the same for redirecting communications received by user devices 150, 154. Therefore, the processes instantiated by the instructions stored in the dispatch manager module 260 may cooperate with the processes instantiated by the instructions stored in the profile manager module 262 to provide a set of processes by which the IVI system 160 redirects incoming communications received by any one of user devices 150, 154 within the cabin 110 of the vehicle 100. It should be noted that the user profiles may have parameters associated with redirecting communications received by user devices 150, 154 based upon one or more identified drive characteristics and one or more occupant activity characteristics or user characteristics.

The drive characteristics module 264 may have instructions stored thereon that when executed by processors 230 enable the IVI system 160 to receive one or more sensor signals such as from sensors 172, 176, 180 and 184 and ascertain one or more drive characteristics therefrom. The drive characteristics may include, for example, an indication of acceleration, deceleration, yaw, turning, pitch, roll, and/or an indication of an accident. The sensor signals from the various sensors 172, 176, 180, 184 may be used individually or in combination to determine one or more drive characteristics. For example, signals from the accelerometer 172 may be used in conjunction with LIDAR signals from LIDAR 176 to determine if the vehicle is accelerating. Additionally any variety of LIDAR, RADAR, or SONAR may be used to determine if the vehicle is in a heavy traffic situation. The drive characteristics as determined by the processors 230 by executing the instructions stored in the drive characteristics module 264 may be provided to the processes executed by the processors 230 by executing the instructions within the dispatch manager 260 to enable redirecting of communications received by one or more user devices 150, 154 within the cockpit 110 of the vehicle 100.

The user characteristics module 266 may have instructions stored thereon that when executed by processors 230 enable the processors 230 and the IVI system 160 to determine activities in which the occupants of the vehicle 100 are engaged. For example, the user characteristics module 266 may have instructions and/or algorithms that enable the processors 230 to determine the interaction of the occupants 130, 140 with one or more of the user devices 150, 154. Furthermore, the user characteristics module 266 may have instructions stored thereon that enable the processors 230 to receive sensor signals from one or more sensors, such as the microphone 166 and the image sensor 168, that may be used to determine activities in which the occupants 130, 140 of the vehicle 100 are engaging. The user characteristics and user activities of the occupants within the vehicle 100 may be provided to the processes enabled by the dispatch manager module 260 to direct and redirect incoming communications to and/or from one or more the user devices 150, 154 within the cabin 110 of the vehicle 100.

It will be appreciated that there may be overlap in the functionality of the instructions stored in the operating system module 242, an applications module 244, a voice over IP manager 246, a messaging manager module 248, a dispatch manager module 260, a profile manager module 262, a drive characteristics module 264, a user characteristics module 266. In fact, the functions of the aforementioned modules 242, 244, 246, 260, 262, 264, 266 may interact and cooperate seamlessly under the framework of the IVI system 201. Indeed, each of the functions described for any of the modules 242, 244, 246, 260, 262, 264, 266 may be stored in any module 242, 244, 246, 260, 262, 264, 266 in accordance with certain embodiments of the disclosure. Further, in certain embodiments, there may be one single module that includes the instructions, programs, and/or applications described within the operating system module 242, an applications module 244, a voice over IP manager 246, a messaging manager module 248, a dispatch manager module 260, a profile manager module 262, a drive characteristics module 264, a user characteristics module 266.

Figure 3:
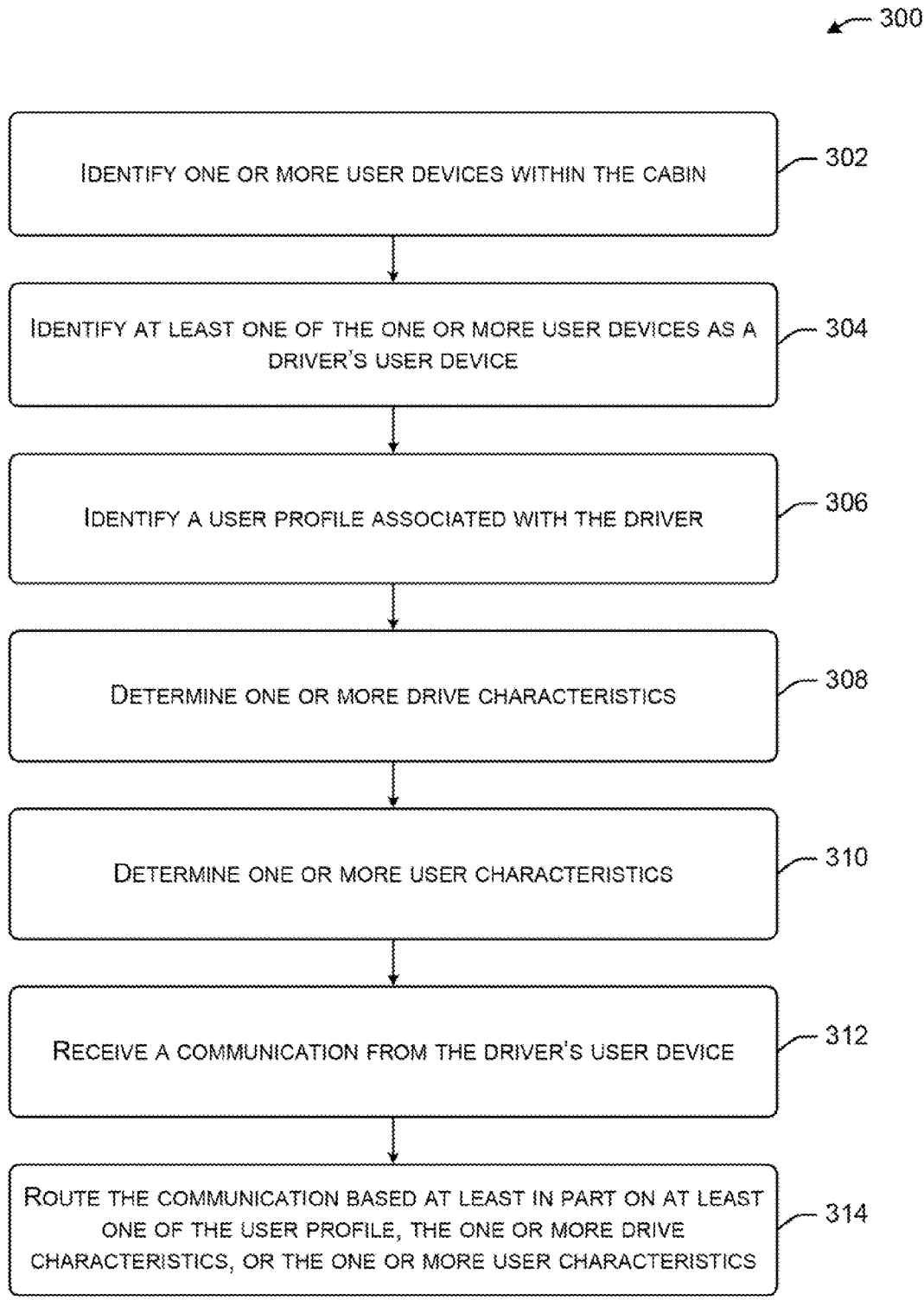
FIG. 3 is a flow diagram illustrating an example method to route communications based, at least in part, on one of a user profile, device characteristics, or user characteristics in accordance with embodiments of the disclosure.

Referring now to FIG. 3, an example method 300 for routing communications received by one or more user devices 150, 154 in accordance with embodiments of the disclosure is described. The processes of method 300 may be executed by the IVI system 160 and the processors thereon 230. Alternatively other systems or subsystems of the vehicle 100 may execute method 300, such as one or more processors associated with a car music system.

At block 302, one or more user devices within the cabin may be identified. As discussed above, the identification of the one or more user devices 150, 154 may be performed by the one or more user devices 150, 154 communicating with the IVI system 160. Therefore the IVI system 160 may receive one or more messages from each of the user devices 150, 154 within the cabin 110 of the vehicle 100. In some cases the IVI system 160 may communicate with each of the user devices 150, 154 wirelessly, such as via Bluetooth or Wi-Fi Direct, in some other cases the user devices 150, 154 may be placed in cradles and may communicate via hard-wired connections to the IVI system 160.

At block 304, at least one of the one or more user devices may be identified as a driver's user device. The driver's user device may be identified by the relative location of the user device within the vehicle. In some cases, images received by the IVI system 160 from the image sensor 168 may be used to determine the driver 130 and the associated user device 150 may be identified as the driver's user device 150. For example, in a family with a mother and father, both of whom may drive the vehicle 100, the image sensor 168 may provide signals to the processors 230 and the processors 230 may provide a positive identification of either the mother or the father and based upon that identification, the driver 130 may be identified as either the mother or father.

In other cases there may be a cradle in which the driver's user device 150 may be placed and may be identified by the IVI system 160. In yet other cases, the driver may identify using one or more applications, such as applications stored in the IVI interface module 218 of the user device 150, to identify the user device 150 as the driver's user device to the IVI system 160 and the processors 230 thereon.

Once the driver's user device is identified, at block 306, a user profile associated with the driver may be identified. The user profile may be accessed directly from the memory 240 of the IVI system 160 or retrieved by the IVI system 160 from one or more profile servers 204 via networks 208. As discussed above the user profile associated with the driver may include a collection of parameters indicating the driver's preferences associated with directing and/or redirecting received communications in a variety of situations such as situations pertaining to drive characteristics or activities of other occupants 130, 140 of the vehicle 100. The identification of the user profile associated with the driver is described in greater detail with reference to FIG. 4 and example method 400.

At block 308, one or more drive characteristics may be determined. As described above, the one or more drive characteristics may be determined by the one or more processors 230 of the IVI system 160 based at least in part on sensor signals received from sensors 172, 176, 180 and 184. For example, a SONAR system mounted at the rear of the vehicle may provide signals indicating the distance between the vehicle 100 and another vehicle behind the vehicle 100. Similarly a RADAR system 180 at the front of the vehicle 100 may provide a range between the vehicle 100 and a vehicle in front of vehicle 100.

The accelerometer 172 may provide an indication of multi-axis g-forces resulting from motion of the vehicle 100. The G-forces in three dimensions may be used to determine the acceleration, deceleration and yaw rate of the vehicle 100. The combination of signals received by the IVI system 160 from the sensors 172, 176, 180 and 184 may be used to determine whether the vehicle 100 is operating in a city driving environment, in a straight highway environment, or if the vehicle is engaging in maneuvers that require relatively more attention from the driver and/or other passengers 140 of the vehicle 100.

At block 310, one or more user characteristics may be determined. The user characteristics may be determined by the IVI system 160 and the processors 230 thereon by analyzing signals received from sensors, such as microphone 166 and image sensor 168, as well as communications and messages from user devices 150, 154. In some cases, the microphone 166 may pick up audio signals such as talking between two or more occupants 130, 140 of the vehicle 100. From this audio, the IVI system 160 may perform speech recognition algorithms to determine if occupants 140 are engaging in navigation and/or other assistance to the driver 130. The IVI system 160 may further determine from the audio if two or more occupants 130, 140 are engaged in a serious conversation or game. The signals from the image sensor 168 may be processed by the IVI system 160 as well to determine if particular users are engaged in an activity. For example, the image sensors 168 may provide images to the IVI system 160 that may be processed to determine that one or the occupants 140 of the vehicle 100 may be reading a book. In some cases, an activity monitor on the user devices 150, 154 may communicate with the IVI system 160 information pertaining to what application(s) are active on the user devices 150, 154. In that case, that activity may be identified and/or recorded by the IVI system 160 and considered when routing communications to that particular user 140. The IVI system 160 may further receive information associated with a particular user's interaction with his or her user device 154. By identifying and analyzing the type of interaction with the user device 154, the IVI system 160 may be able to assess the relative level of engagement of that particular user 140 with his or her user device 154. For example, if a particular user 140 is engaged in an interactive game on his or her user device that cannot be paused due to a real-time nature of that game, the IVI system 160 may consider that activity associated with that particular user 140 when determining how to route a particular incoming communication on the user device 150 associated with the driver 130.

At block 312, a communication may be received on the driver's user device. As indicated earlier, the communication may include one or more of a voice communication such as a telephone call or a text message or SMS message or a social media update such as a Facebook® update or a Tweet®. In certain embodiments, the received communication may be directed to the IVI system 160 from the driver's user device 130 via cooperation between the IVI system 160 and the user device 150. For example, the user device and the processors 210 thereon may execute instructions stored in IVI interface 218 to redirect an incoming communication to the IVI system 160. In the same or different embodiments the processors 230 of the IVI system 160 may execute instructions stored in the voice over IP manager module 246 and/or the messaging manager module 248 to retrieve incoming communications to the user device 150. Upon receiving the communication from the user's device, at block 314, the communication may be routed based at least in part on the user profile, the one or more drive characteristics and/or the one or more user characteristics. The routing of the communication may be to one or more of the other user devices 154 within the vehicle 100. The choice of the user device may be based at least in part on the variety of factors determined in the processes of blocks 306 to 310. In other embodiments the communication may be rendered on one of the control panel 164 and/or the speakers 162 of the vehicle 100. In yet other cases the communication may be stored such as to a voice mail system for rendering at a later time when it may be more appropriate for rendering the communication.

It should be noted, that the method 300 may be modified in various ways in accordance with certain embodiments of the disclosure. For example, one or more operations of method 300 may be eliminated or executed out of order in other embodiments of the disclosure. Additionally, other operations may be added to method 300 in accordance with other embodiments of the disclosure.

Figure 4:
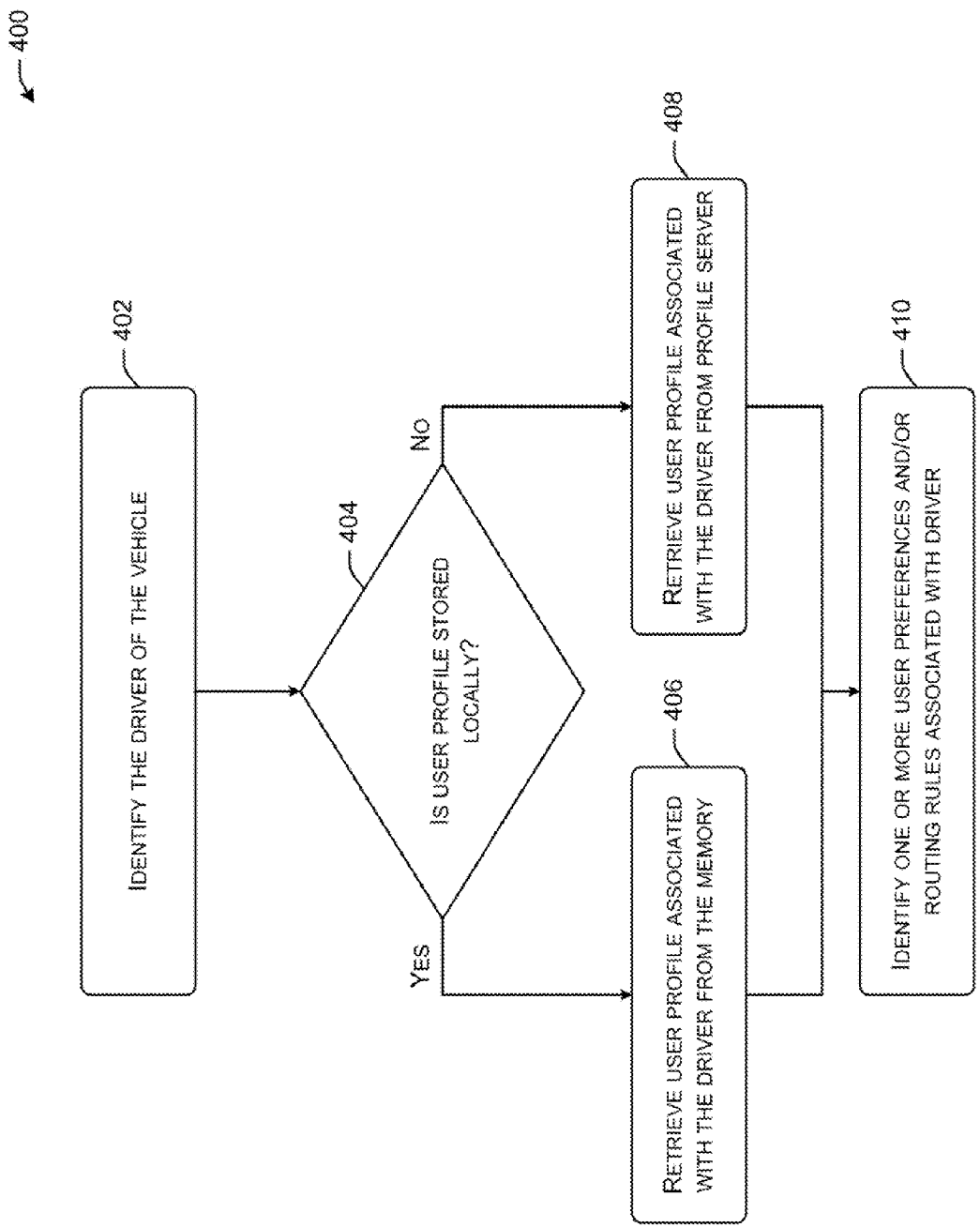
FIG. 4 is a flow diagram illustrating an example method for identifying one or more user preferences or routing rules associated with the driver.

Referring now to FIG. 4 a method 400 for identifying one or more user preferences and/or routing rules associated with the driver 130 based at least in part on a user profile is described. Portions of method 400 may be associated with process 306 of method 300 of FIG. 3. Method 400 may be performed by the IVI system 160 and the processors 230 thereon or other suitable systems and/or subsystems of vehicle 100. At block 402, the driver 130 of the vehicle 100 may be identified. The processes associated in identifying the driver may be similar to the processes described in blocks 302 and 304 of method 300 of FIG. 3.

At block 404, it may be determined if the user profile is stored locally on the IVI system. If the user profile is stored locally on the IVI system 160 then at block 406 the user profile associated with the driver may be retrieved from the memory 240. In this case, the memory 240 or partitions thereof may have areas where one or more user profiles associated with occupants 130, 140 of the vehicle 100 may be stored. If at block 404 it is determined that the user profile is not stored locally, then at block 408 the user profile associated with the driver may be retrieved from the profile server 204.

Once the user profile is retrieved by the one or more processors 230 in either of blocks 406 or 408, at block 410, one or more user preferences and/or routing rules associated with the driver may be identified. The one or more user preferences and/or routing rules may be codified as parameters that constitute the user profile associated with the driver. The user preferences and/or routing rules may indicate how to route an incoming communication to the driver's 130 user device 150 in a variety of circumstances. For example, in some cases the routing of the incoming communication may be based upon drive characteristics such as drive characteristics that may indicate that the driver 130 has to pay a relatively higher level of attention to driving the vehicle 100. Therefore, when the user or the driver 130 is relatively more engaged in driving the vehicle 100, he/she may not receive calls or in some cases the communications may be directed to a storage or buffer system such as voice mail.

Additionally when one or more user preferences or routing rules may consider the activities of other occupants 140 of the vehicle 100. For example, if other occupants 140 are available to interact with the communications received by the user device 150, then that communication may be rerouted to one or more of the other user devices 154. However, if all the occupants of the vehicle are engaged in other activities and cannot interact with the incoming communication on the user device 150 then that communication may not be rerouted to the other user devices 154 and the corresponding users 140.

Figure 5:
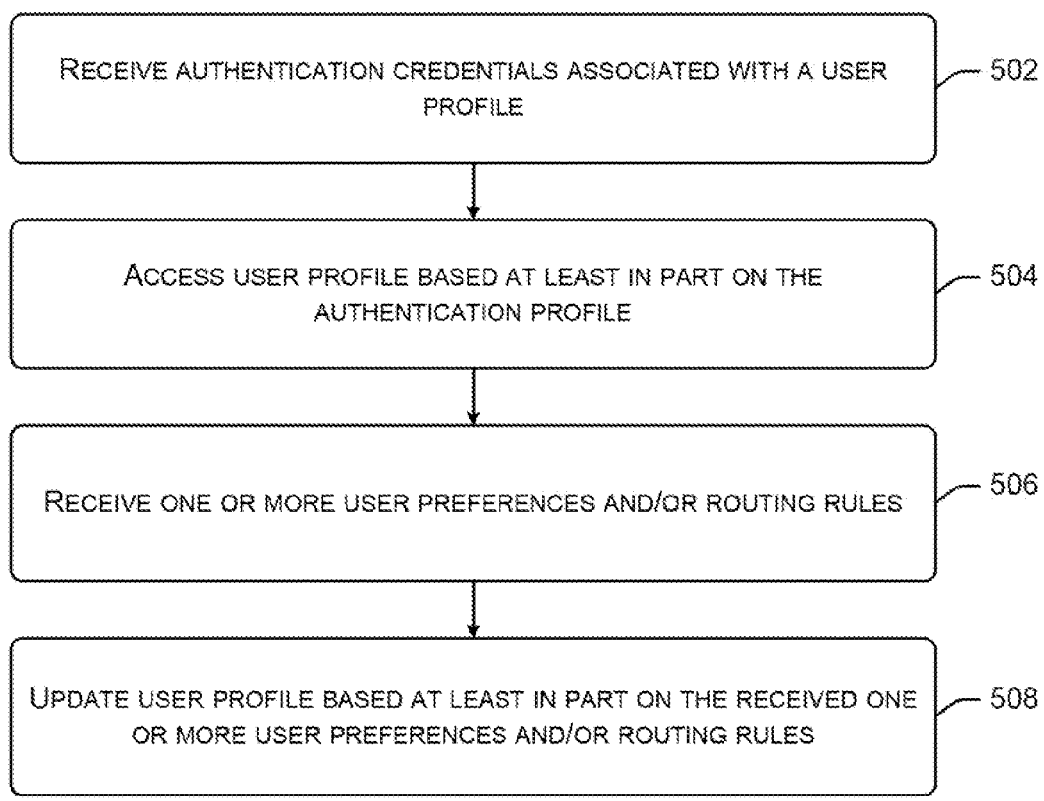
FIG. 5 is a flow diagram illustrating an example method for updating user profiles based, at least in part, on received one or more user preferences and/or routing rules in accordance with embodiments of the disclosure.

Referring now to FIG. 5, an example method 500 for updating a user profile in accordance with embodiments of the disclosure is described. The processes of method 500 may be performed by the profile servers 204 and the processors thereon. At block 502, the profile server 204 may receive authentication credentials associated with the user profile. The authentication credentials may include a login and password and certain other cases the authentication credential may also include biometric information such as a finger print scan or a retinal scan or voice recognition. In yet other cases the authentication credentials may include additional information such as person information associated with the user profile being accessed.

At block 504, the user profile may be accessed based at least in part on the authentication profile. In this case it is accessed when the authentication credentials are verified to be appropriate for accessing the user profile. In other words the user may access the user profile upon providing authentication credentials that allow access to the user profile by the profile servers 204.

At block 506, one or more user preferences and/or routing rules may be received. At least one or more user preferences and/or routing rules may be provided to the profile servers 204 by the user via user devices 150, 154. These user preferences and/or routing rules may indicate the user's desire for how to handle incoming communications. For example, the user may indicate particular callers to his or her user device 150 and how those callers should be rerouted. For example, certain callers may be provided to a storage and/or buffer process such as voicemail. Other callers may be rerouted to family members that may be present within the vehicle 100. And yet other callers may be rerouted to colleagues or business associates that may be within the vehicle 100.

Furthermore, the user may specify whether he or she wishes to receive a call or how the call should be rendered under a variety of situations such as city driving, highway driving, on ramps, accelerating driving, deceleration during driving and/or during heavy traffic periods. The user may further specify whether he or she wishes to interrupt other occupants of the vehicle if those occupants are engaged in particular activities. For example, a particular user may choose to not interrupt another occupant within the vehicle 100 in cases where that occupant is engaged in an interactive game on his or her user device 154.

At block 508, the user profile may be updated based at least in part on the receipt one or more user preferences and/or routing rules. In this case, parameters associated with those received one or more user preferences and/or routing rules may be updated, changed, or initially specified. The new updated user profile may the be available for downloading to one or more IVI systems 160 for use in routing and/or rerouting of incoming communications to user devices 150, 154 within the cabin 110 of the vehicle 100 in accordance with embodiments of the disclosure as described herein.

Figure 6:
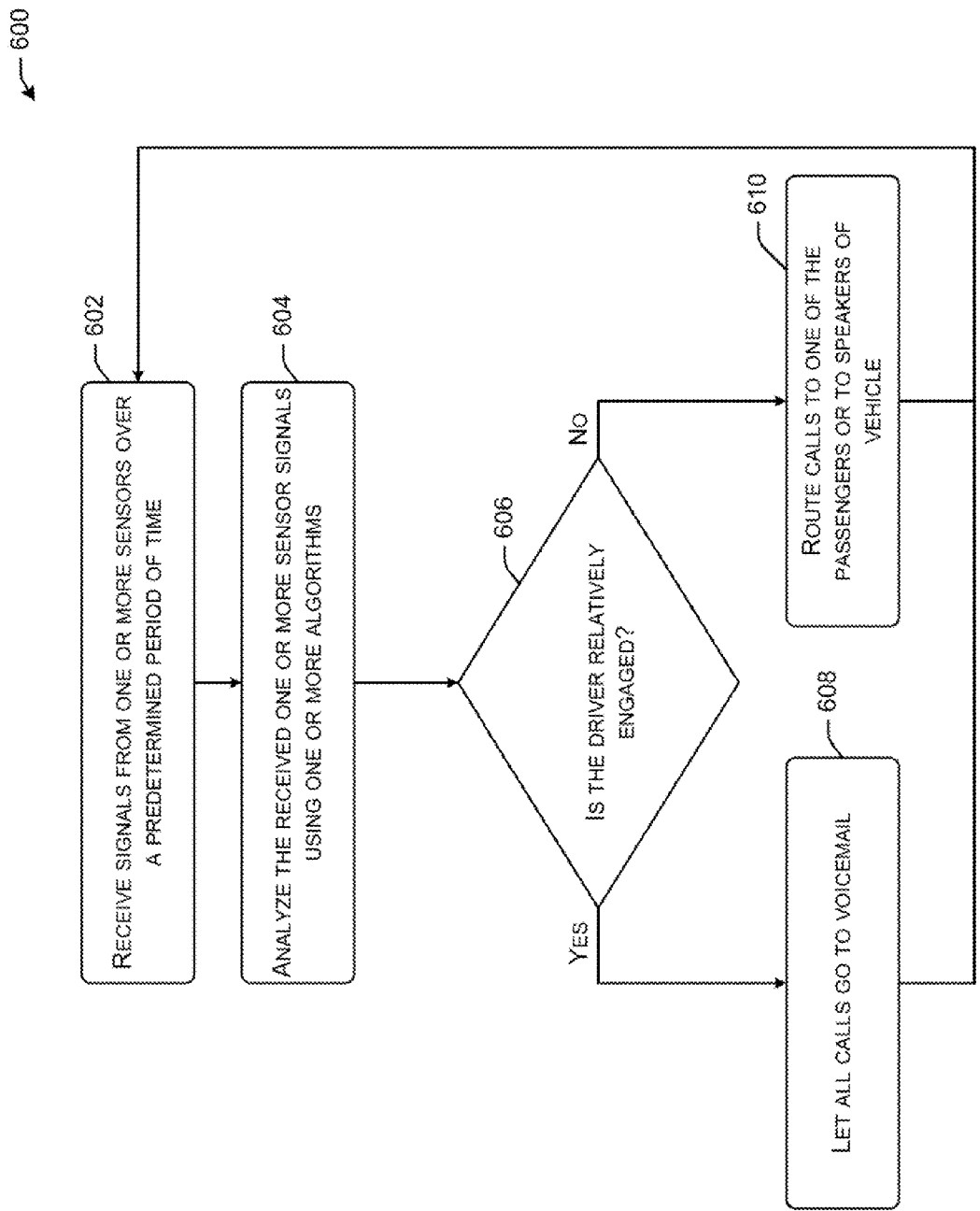
FIG. 6 is a flow diagram illustrating an example method of muting calls to one of the passengers or to speakers of the car in accordance with embodiments of the disclosure.

Referring now to FIG. 6, an example method 600 for routing calls to a driver in accordance with embodiments of the disclosure is described. The method 600 may be performed by the IVI system 160 or other suitable systems and/or subsystems of vehicle 100. At block 602, signals from one or more sensors over a predetermined period of time may be received. The sensors may be sensors, such as accelerometer 172, LIDAR 176, RADAR 180 and/or SONAR 184.

At block 604, the received one or more sensor signals may be analyzed using one or more algorithms. The algorithms for analyzing the one or more sensor signals may be stored in the drive characteristics module 264 and executed by processors 230 of the IVI system 160. The analysis using one or more algorithms may provide the IVI system 160 with information relating to acceleration, deceleration, yaw, turning and course corrections or changes associated with the vehicle 100. The analysis may further indicate due proximity of other vehicles to the vehicle 100 as well as whether the vehicle has been involved in an accident or if airbags of the vehicle have been deployed.

From the one or more sensor signals and the analysis thereof, at block 606, it may be determined if the driver is relatively engaged driver may be determined to be relative engaged if the level of acceleration, deceleration or course change of the vehicle 100 is above predetermined respective threshold levels. Additionally, the driver may be determined to be relatively engaged if the driver is encountering a high level of traffic and/or city driving. If at block 606 it is determined that the driver is relatively engaged in activities associated with driving, then at block 608 all calls may go to voicemail that are received by the driver's user device or could be routed to other passenger's devices 154 depending on user profiles.

Alternatively, if the driver is determined to not be relatively engaged in processes associated with driving at block 606, then at block 610 calls received by the user device of the driver may be routed to one of the passengers in the vehicle or to the speakers of the vehicle. Therefore generally calls may go to a storage or buffer process such as voicemail or other may be routed to other passengers, when the driver is relatively busy in driving and when the driver is not as busy with the tasks associated with driving the vehicle 100 then calls may still be routed to other passengers or rendered over the speaker of the vehicle 100.

In certain embodiments, passengers 140, such as those in the back seats of the cabin, may use their respective user device devices 154 to capture voice or enter messages for a particular communication session as an interactive group activity. For example, if the communication is rendered on the speakers 162, more than one occupant 130, 140 may use their own user devices 154 to speak or enter messages into the communications session. Therefore, in certain embodiments, the IVI system 160 may receive input messages from the one of more user device 154 for interaction with the communications session.

Figure 7:
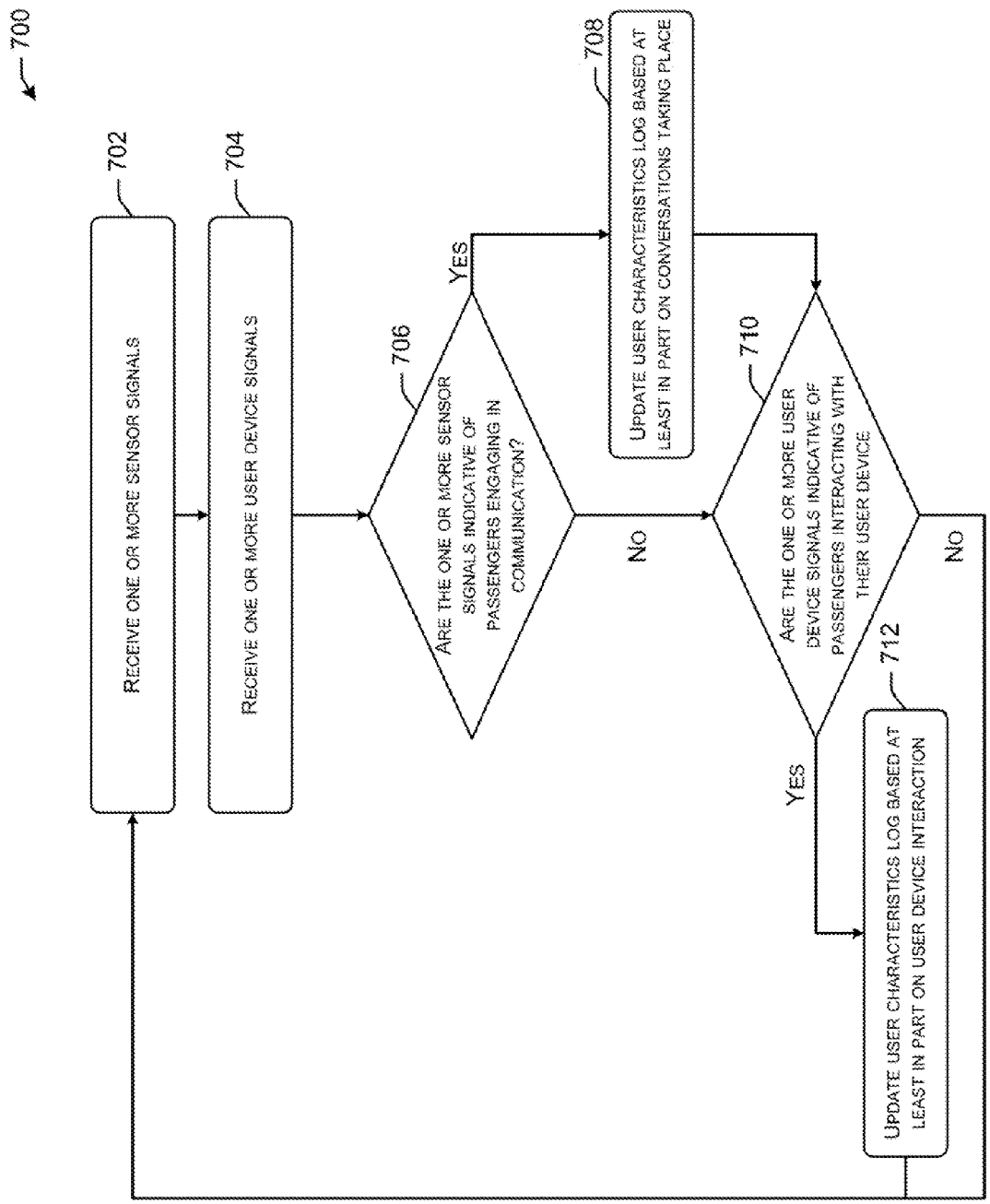
FIG. 7 is a flow diagram illustrating an example method of updating a user characteristics log based in accordance with embodiments of the disclosure.

Referring now to FIG. 7, an example method 700 for updating a user's characteristic log in accordance with embodiments of the disclosure is described. The method 700 may be performed by the IVI system 160 or other suitable systems and/or subsystems of the vehicle 100. At block 702, one or more sensor signals may be received. The sensors may include the microphone 166 and/or the image sensor 168. The sensor signals may be indicative of speaking or other audio within the vehicle 100. Additionally the sensor signals may be associated with video and/or images of occupants 130, 140 within the vehicle 100.

At block 704 one or more user device signals may be received. The user device signals may be indicative of the type of interaction that a particular user and/or occupant of the vehicle 100 may be engaged in with his or her respective user device 150, 154. At block 706, it may be determined if the one or more sensor signals are indicative of passengers engaging in communications within the vehicle. If two or more passengers are talking to each other the IVI system may be able to determine this interaction based upon signals received from the microphone 166 and processed using one or more algorithms performed by the processors 230. If at block 706 it is determined that one or more passengers 140 are engaging in communication then a user characteristics log may be updated based at least in part on conversations taking place. For example, the user characteristics log may be an indicator of current activity of each of the occupants of the vehicle 100. If at block 706 it is determined that one or more passengers are not engaged in communication then at block 710 it may be determined if the one or more user device signals are indicative of the passengers interacting with the user device.

If it is determined that one or more passengers are interacting with their user device then at block 712 user characteristics log may be updated based at least in part on user device interactions that have been detected. If at block 710 it is determined that user devices are not being interacted with by the passengers 140 then the method 700 may return to block 702 to continue to receive one or more sensor signals. In effect by executing method 700 a running update of all occupant 130, 140 activities may be continuously updated in case such information is required for the purposes of routing and/or rerouting incoming communications to one or more user devices 150, 154.

Figure 8:
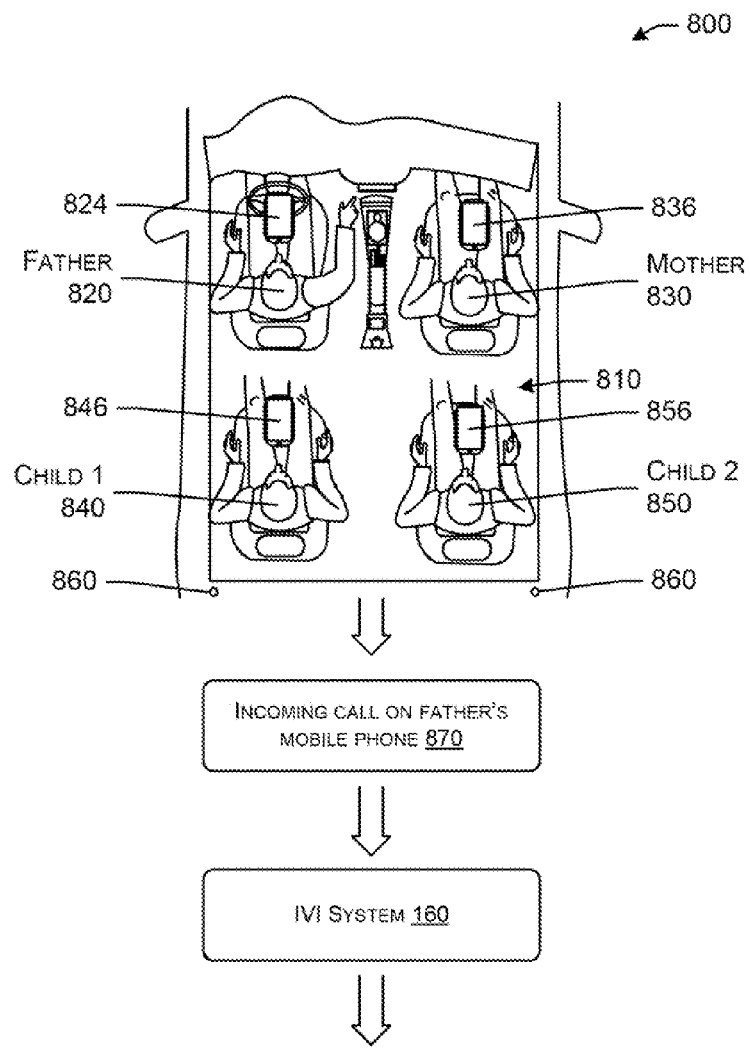
FIG. 8 is a simplified schematic diagram of example situations for routing a mobile phone call under a variety of drive, user, and call characteristics in accordance with embodiments of the disclosure.

Referring now to FIG. 8, an example scenario 800 of routing an incoming call on a driver's 820 user device 824 is depicted in accordance with embodiments of the disclosure. In this example a father 820 may be the driver with associated user device 824. The mother 830 may have associated user device 836. A first child 840 may have associated user device 846. A second child 850 may have associated user device 856A call may be received on the father's mobile phone 824 as depicted in block 870. This incoming call may be received by the IVI system 160. The IVI system may then reroute that call or let that call go to voicemail based upon a number of situations detected within the cabin 810 of the vehicle 800.

A variety of these non-limiting examples of rerouting the incoming call is depicted for a variety of situations. For example, if the drive characteristics indicate that the vehicle 800 is traveling on a straight highway and if the user characteristics indicate that all the occupants are listening to music and a telephone call is received from a family member such as a grandmother, then the call may be routed to the car speakers 860. In another non-limiting example the drive characteristics may indicate a straight highway. The use characteristic may indicate that all of the passengers are engaged in individual activities such as interacting with user devices. The incoming call may be from the father's place of employment and in this case the call may be routed to voicemail. In another non-limited example, the drive characteristics may indicate a straight highway. The user characteristics may indicate that the occupants 130, 140 are engaged in little or no activities. The incoming call on the father's mobile phone 124 may be from a family friend and in this case the call may be routed to the mother and her mobile 826. And yet another non-limited example, the drive characteristics detected may indicate city driving. The use characteristics may indicate that the mother is helping the father navigate. The call received may be from a family friend and in this case the call may be routed to voicemail since various occupants 820, 830 of the vehicle 800 are engaged in activities that are not conducive to taking the incoming phone call. In another non-limiting example, the drive characteristics may indicate city driving. The user characteristics may indicate that the mother is emailing from her user device 836 and a call may be received from the grandmother and in this case the call may be routed to one or more of the user devices 846, 856 associated with the children 840, 850. As another non-limiting example, consider that the drive characteristics indicate that the vehicle 800 is on an onramp to a highway and the user characteristics indicate that there is little or no activities amongst the occupants 820, 830, 840, 840 of the vehicle 800 and the call is from the grandmother. In this case the call may be routed to voicemail as the father 820 may have to engage in extra attention while on the on-ramp to the highway.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The tangible machine-readable media may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method, comprising: identifying, by one or more processors associated with a vehicle, one or more user devices; determining, by the one or more processors, at least one of the one or more user devices as a driver's user device; identifying, by the one or more processors, a user profile associated with the driver's user device; identifying, by the one or more processors, a communication received from the driver's user device; receiving, by the one or more processor, one or more sensor signals; determining, by the one or more processors, a drive characteristic based at least in a part on the one or more sensor signals; and causing to send, by the one or more processors, the communication to a second user device identified from the one or more user devices based at least in part on the drive characteristic and the user profile, further comprising: identifying, by the one or more processors, one or more received second sensor signals; and determining, by the one or more processors, a user characteristic based at least in part on the one or more received second sensor signals.

2. The method of claim 1, wherein identifying the one or more user devices comprises receiving, by the one or more processors, one or more messages corresponding to each of the one or more user devices.

3. The method of claim 1, wherein determining at least one of the one or more user devices as the driver's user device comprises receiving, by the one or more processors, a message from the driver's user device.

4. The method of claim 1, wherein identifying the user profile associated with the driver's user device comprises receiving the user profile from a profile server.

5. The method of claim 1, wherein the drive characteristic comprises at least one of: (i) velocity of the vehicle; (ii) acceleration of the vehicle; (iii) deceleration of the vehicle; (iv) roll of the vehicle; (v) yaw rate of the vehicle; (vi) angular acceleration of the vehicle; (vii) indication of an accident; (viii) indication of deployment of an airbag of the vehicle; (ix) visibility conditions; (x) road conditions; (xi) current velocity; or (xii) current position.

6. The method of claim 1, wherein sending the communication comprises sending the communication based at least in part on the user characteristic.

7. A system, comprising: one or more sensors; and one or more processors configured to: identify, one or more user devices; determine at least one of the one or more user devices as a first user device; identify a user profile associated with the first user device; determine a drive characteristic based at least in part on one or more signals received from the one or more sensors; identify, a communication received from the first user device; and cause to send the communication to a second user device identified from the one or more user devices or to a non-transitory memory associated with the driver's user device based at least in part on the user profile and the drive characteristic, further comprising: identifying, by the one or more processors, one or more received second sensor signals; and determining, by the one or more processors, a user characteristic based at least in part on the one or more received second sensor signals.

8. The system of claim 7, wherein the one or more processors are further configured to generate the user profile associated with the first user device.

9. The system of claim 7, wherein the drive characteristic comprises at least one of: (i) velocity of a vehicle; (ii)

acceleration of the vehicle; (iii) deceleration of the vehicle; (iv) roll &the vehicle; (v) yaw rate &the vehicle; i) angular acceleration of the vehicle; (vii) indication of an accident; or (viii) indication of deployment of an airbag of the vehicle; (ix) visibility conditions; (x) road conditions; (xi) current velocity; or (xii) current position.

10. The system of claim 7, wherein the communication is at least one of: (i) a voice call; (ii) a text message; (iii) an SMS message; or (iv) a social networking message.

11. The system of claim 7, wherein the one or more processors configured to cause to send the communication comprises the one or more processors configured to cause to send the communication to at least one of: (i) a speaker of a vehicle; (ii) a voice mail system associated with the first user device; or (iii) a second user devices.

12. A non-transitory computer readable media comprising computer-executable instructions that, when executed by one or more processors, configure the one or more processors to: identify at least one user device as a driver's user device; determining at least one of the one or more user devices as a driver's user device; identify a received user profile associated with the driver's user device; determine a drive characteristic based at least in part on one or more signals received from the one or more sensors; identify a communication received from the driver's user device; receiving, by the one or more processors, one or more sensor signals; identify, one or more received second sensor signals; and determine a user characteristic based at least in part, on the received one or more second sensor signals; and cause to send the communication to a second user device based at least in part on the user profile, the drive characteristic, and the user characteristic.

13. The computer readable media of claim 12, wherein the one or more processors are further configured to generate the user profile associated with the driver's user device.

14. The computer readable media of claim 12, wherein the communication is at least one of: (i) a voice call; (ii) a text message; (iii) an SMS message; or (iv) a social networking message.

15. The computer readable media of claim 12, wherein the user characteristic comprises one or more parameters that indicate the activity of one or more users.

16. The computer readable media of claim 12, wherein one or more processors configured to cause to send the communication comprises the one or more processors configured to cause to send the communication to at least one of: (i) a speaker of a vehicle; or (ii) a voice mail system associated with the driver's user device.

17. The computer readable media of claim 16, wherein the one or more processors configured to cause to send the communication comprises the one or more processors configured to cause to receive one or more second communications from the at least one user devices.

* * * * *

UNITED STATES PATENT AND TRADEMARK OFFICE
CERTIFICATE OF CORRECTION

PATENT NO. : 9,608,952 B2  
APPLICATION NO. : 13/714908  
DATED : March 28, 2017  
INVENTOR(S) : Chieh-Yih Wan, Sangita Sharma and Giuseppe Raffa Page 1 of 1

It is certified that error appears in the above-identified patent and that said Letters Patent is hereby corrected as shown below:

In the Claims

Column 21  
Claim 9, Line 2 please change "(iv) roll &the vehicle; (v) yaw rate &the vehicle" to "(iv) roll of the vehicle; (v) yaw rate of the vehicle;"

Signed and Sealed this  
Twenty-seventh Day of June, 2017

Joseph Matal  
*Performing the Functions and Duties of the*  
*Under Secretary of Commerce for Intellectual Property and*  
*Director of the United States Patent and Trademark Office*